Patented June 24, 1941

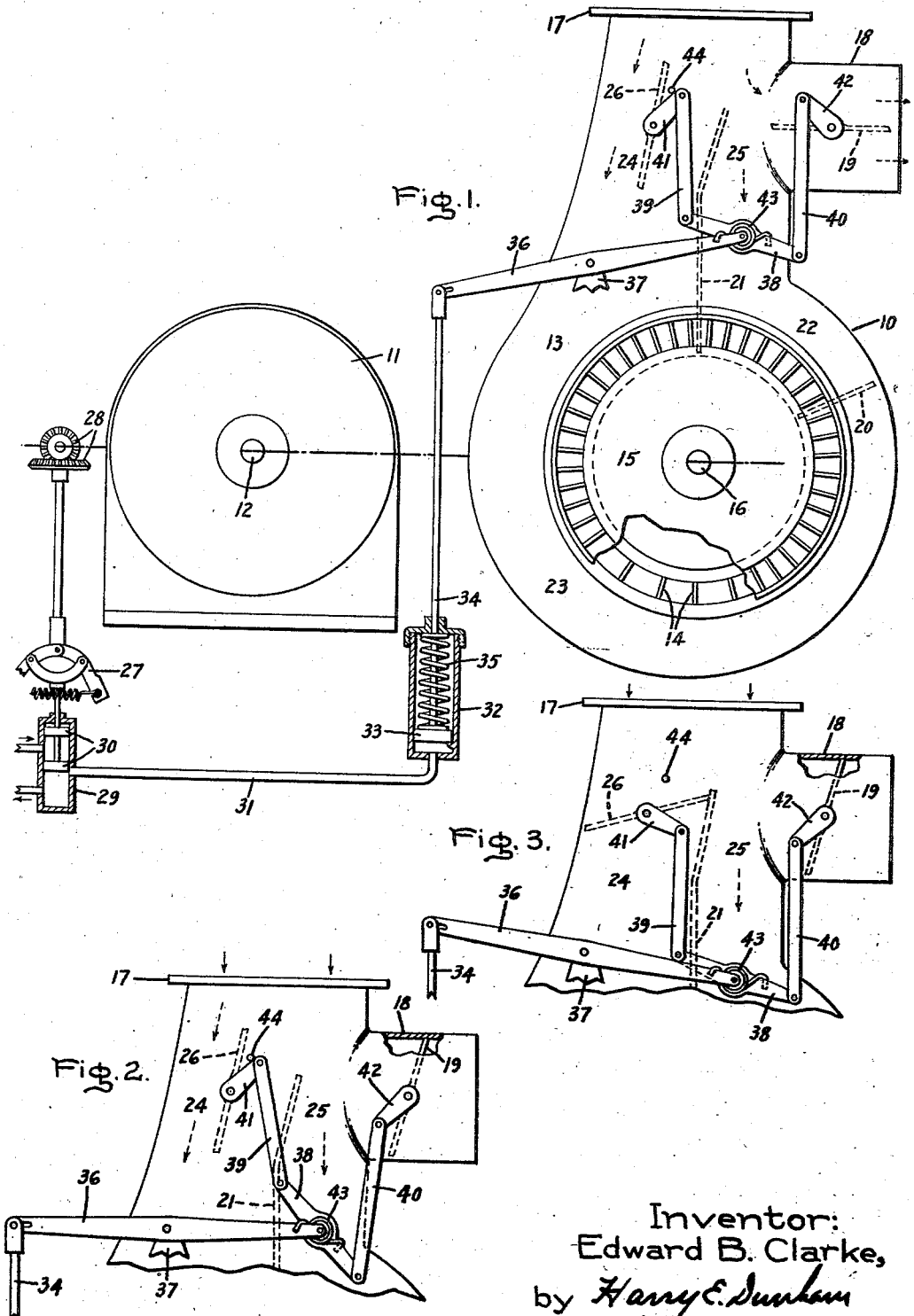

2,247,151

UNITED STATES PATENT OFFICE 2,247,151

GOVERNING MECHANISM

Edward B. Clarke, Lynn, Mass., assignor to General Electric Company, a corporation of New York Application September 3, 1938, Serial No. 228,383

5 Claims. (Cl. 253—39)

The present invention relates to governing mechanisms as may be used for controlling the operation of a gas turbine for driving a generator or a supercharger or like machine in aircraft plants or the like. The invention is of particular significance with regard to gas turbine arrangements in which exhaust gas from a combustion engine is supplied to a gas turbine.

The object of my invention is to provide an improved construction and arrangement of governing mechanisms of the kind above specified whereby accurate control of a gas turbine power plant may be readily effected by comparatively simple means.

For a consideration of what I believe to be novel and my invention, attention is directed to the following description and the claims appended thereto in connection with the accompanying drawing.

In the drawing, Fig. 1 illustrates a gas turbine power plant with a governing mechanism embodying my invention; and Figs. 2 and 3 show certain parts of Fig. 1 in different operating positions.

The arrangement of Fig. 1 comprises a gas turbine 10 for driving a machine, in the present instance an alternator 11, having a shaft 12. The gas turbine comprises a nozzle box 13 with a ring of nozzles 14 for conducting gas under pressure to a bucket wheel 15 rotatably secured to a shaft 16. The shaft 16 may form an overhung portion of the generator shaft 12, and the gases may be discharged from the bucket wheel into the atmosphere as shown in the application of Samuel R. Puffer Serial No. 212,297 filed on June 7, 1938 and assigned to the same assignee as the present application. The nozzle box 13 has a flanged inlet conduit 17 for connection to a source of gas under pressure, such as the exhaust manifold of a combustion engine. A waste gate comprising a waste conduit 18 with a waste or gate valve 19 is connected to the inlet conduit 17 whereby a portion of the gas may be discharged directly to atmosphere without passing through the turbine. The nozzle box has two dams or partitions 20 and 21 which define two compartments, a short compartment 22 and a long compartment 23, in the nozzle box. The dam 21 projects into the inlet conduit 17, dividing the latter into two channels 24 and 25. One of the channels, in the present instance, the channel 24, includes a control or gate valve 26. This valve may be termed a compartment valve in that it controls the flow of gases to the compartments 22 and 23. In the position shown in Fig. 1 the gate valve 26 for the channel 24 and the waste valve 19 are in open position. Under this condition gas conducted to the inlet channel 17 is partly discharged therefrom thru the waste conduit 18 and partly supplied to the two compartments 22 and 23. The closing of the waste valve 19, as shown in Fig. 2, causes all the gas to be supplied to the two compartments 22 and 23 in the nozzle box, and finally, closing of the gate valve 19 and the large valve 26 causes all the gas conducted to the conduit 17 to be supplied to the small compartment 22. Thus, the valve 26 and the separate compartments in the nozzle box permit partial admission operation of the gas turbine, by partial admission being meant operation of the turbine with the gas supplied only along an arc of the bucket wheel. With a given amount of available gas, partial admission operation permits higher load output than operation with full admission. As long as an excessive amount of gas is conducted to the conduit 17 which is the case when a combustion engine connected to the conduit 17 is operated at maximum speed, both valves 19 and 26 are in open position, as shown in Fig. 1, causing waste of a portion of the gas and full admission to the turbine wheel 14.

During normal operation, as in the case of an aircraft during cruising, the waste valve is closed and the large compartment valve 26 open, as shown in Fig. 2, causing full admission to the turbine wheel of all the gas conducted to the conduit 17. When a small amount of gas is received by the conduit 17, which in the case of aircraft operation may take place during gliding of the aircraft, both valves 19 and 26 are closed, causing partial admission operation with all the gas conducted to the small compartment 22 to effect maximum load output with a given small amount of gas. Thus, with a decreasing supply of gas to the inlet conduit 17 it is desirable first gradually to close the waste valve 19 and after this valve is in closing or near closing position gradually to close the large compartment valve 26. The operation of the two valves in the aforesaid manner is automatically effected in accordance with my invention by a governing mechanism connected to the valves.

The governing mechanism is responsive to changes of an operating condition of the gas turbine or an element connected thereto. In the present example the governing mechanism comprises a speed governor 27 driven from the shaft 12 through a gearing 28 and connected to a pilot valve 29 having valve heads 30 for controlling the flow of operating fluid through a conduit 31 to a hydraulic motor 32 with a piston 33 connected to a stem 34. The piston stem 34 is surrounded by a spring 35 biasing the piston 33 downwardly. The mechanism shown in Fig. 1 is a maximum speed position in which the pilot valve heads 30 are in an upper position, permitting all of the operating fluid to drain from the lower portion of the hydraulic motor 32, the piston of the latter being in its lower end position. The maximum speed position is the same as in case of failure of oil pressure due to breakage of an oil line. A drop in speed during operation causes downward movement of the pilot valve heads 30 whereby operating fluid under pressure is admitted through the pilot valve to the conduit 31 and the hydraulic motor 32, forcing the piston 33 upward against the biasing force of the spring 35. The upper end of the piston stem 34 is pivoted to the left-hand end of a lever 36 which has an intermediate portion supported on a fulcrum 37 and a right-hand end pivotally connected to an intermediate point of a floating lever 38. The two ends of the lever 38 are connected to links 39 and 40 respectively. The link 39 is pivoted to an arm 41 of the large compartment valve 26 and the link 40 is pivoted to an arm 42 of the waste valve 19. The connection between the fulcrumed lever 36 and the floating lever 38 includes a spirally wound spring 43 which tends to turn the floating lever 38 in clockwise direction about its pivotal connection with the fulcrumed lever 36. Thus, the spring tends to force the link 40 downward and the link 39 upward. This movement of the links is limited by a stop 44 fastened to the outside of the conduit 17 and engaging the arm 41 in the operating position of Fig. 1. If now, due to a decrease in speed, the stem 34 of the hydraulic motor is moved upward, the fulcrumed lever 36 turns about its fulcrum 37 whereby the right-hand end of the floating lever 38 is moved downward due to downward movement of the right-hand end of the fulcrumed lever 37 into the position shown in Fig. 2 in which the waste valve 19 is closed. During movement of the mechanism from the position in Fig. 1 to the position in Fig. 2 the link 39 turns about its pivotal connection with the arm 41. The upper end of the link is prevented from upward movement by the stop 44 engaging the arm 41 and limiting movement of the valve 26. A further drop in speed causes further clockwise turning movement of the lever 36. Further downward movement of the right-hand end of the lever 36 causes counterclockwise turning movement of the lever 38 about its pivotal connection with the right-hand end of the fulcrumed lever 36 gradually closing the large compartment valve 26 until the position shown in Fig. 3 is reached in which the valve 26 is completely shut. In Fig. 2 the waste valve 19 engages the wall of the conduit 18, the latter thereby limits movement of the valve 19 and its arm 42.

The tension of the spring 43 is released as the mechanism moves from the position shown in Fig. 1 into the position of Fig. 2 and thereafter the tension of the spring 43 is increased as the mechanism is moved from the position of Fig. 2 to that of Fig. 3. The spring is under the least tension in the position of Fig. 2. This constitutes the spring a yieldable means which tends to hold the large compartment valve 26 in open position and the waste valve 19 in closed position.

Thus, with my invention I have accomplished an improved construction and arrangement whereby two valves may be moved in succession from opening towards closing position. In the embodiment shown in the drawing the first of these valves serves to control the flow of fluid or exhaust gas to a large compartment of a gas turbine nozzle box or, from another viewpoint, the first valve serves to control the partial admission or the ratio of admission of operating fluid to two compartments of a nozzle box and consequently to two sections of a turbine wheel. The second valve in the present instance controls the waste of gas or operating fluid; from a broader viewpoint, the second valve controls the ratio of the amount of fluid conducted to the turbine and the fluid conducted to another point, in the present instance, to atmosphere. The valves are connected by links to a lever mechanism controlled by a governor. The mechanism includes yieldable means in the form of a spring connected between two levers and acting to hold the first valve in open position until the second valve is shut.

What I claim as new and desire to secure by Letters Patent of the United States, is:

1. The combination of an elastic fluid-turbine having a bucket wheel, conduit means forming two channels for conducting elastic fluid to separate sections of the wheel, a first valve in one of the channels, another conduit with a second valve connected to the conduit means for by-passing fluid with regard to the wheel, and a mechanism for controlling the first and the second valve comprising a fulcrumed lever, a floating lever pivotally connected to the fulcrumed lever and to the valves, and yieldable means connected to the levers to effect successive closing and opening of the valves and to prevent closing of said first valve as long as the second valve is in opening position.

2. The combination of an elastic fluid turbine having a bucket wheel, conduit means forming two channels for conducting elastic fluid to separate sections of the wheel, a valve in one of the channels to control the ratio of fluid flowing through the two channels, another conduit with a valve connected to the conduit means for by-passing fluid with regard to the wheel, and a mechanism for controlling the valves comprising a fulcrumed lever, a floating lever having an intermediate point pivotally connected to the fulcrumed lever and ends connected to the valves, and a spring connected between the two levers to bias one valve towards opening position and the other towards closing position in order to effect successive opening and closing of the valves.

3. The combination of a gas turbine having a nozzle box forming two compartments, conduit means forming two channels for separately conducting gases to the two compartments, one of the channels including a valve to control the ratio of the amount of gas conducted to the two compartments, a waste conduit with a waste valve connected to the conduit means to discharge gas therefrom, and a governing mechanism for controlling the channel valve and the waste valve comprising a link and lever mechanism connected to the valves, and yieldable means biasing the channel valve towards opening position and the waste valve towards closing position and to prevent closing of the channel valve while the waste valve is in open position.

4. The combination of a gas turbine having a nozzle box forming two compartments, conduit means forming two channels for separately conducting gases to the two compartments, one of the channels including a valve to control the ratio of the amount of gas conducted to the two compartments, a waste conduit with a waste valve connected to the conduit means to discharge gas therefrom, and a governing mechanism for controlling the channel valve and the waste valve comprising a fulcrumed lever, means including a speed governor driven from the turbine and connected to a point of the fulcrumed lever, a floating lever having an intermediate point connected to the fulcrumed lever and ends connected to the valves, spring means connected between the fulcrumed and floating levers to effect successive opening and closing of the valves, and stop means limiting movement of the valves.

5. The combination of an exhaust gas operated gas turbine nozzle box having two partitions forming two chambers, a single inlet conduit connected to the chambers on both sides of one of the partitions, said last mentioned partition having an extension in the inlet conduit to define two channels therewith, and means including a valve in one of the channels and a valved bypass connected to the other channel to control the flow of gases to the chambers, the other channel being free of valves.

EDWARD B. CLARKE.